Jan. 2, 1968          W. K. ROOTS          3,361,889

CONTROL SYSTEMS AND PROCESSES

Filed Jan. 6, 1965          3 Sheets-Sheet 1

INVENTOR:
William K. Roots
By Ralph M. Braunstein
Attorney

Jan. 2, 1968 W. K. ROOTS 3,361,889
CONTROL SYSTEMS AND PROCESSES
Filed Jan. 6, 1965 3 Sheets-Sheet 2

INVENTOR:
William K. Roots
By Ralph M Braunstein
Attorney

Jan. 2, 1968      W. K. ROOTS      3,361,889
CONTROL SYSTEMS AND PROCESSES
Filed Jan. 6, 1965      3 Sheets-Sheet 3
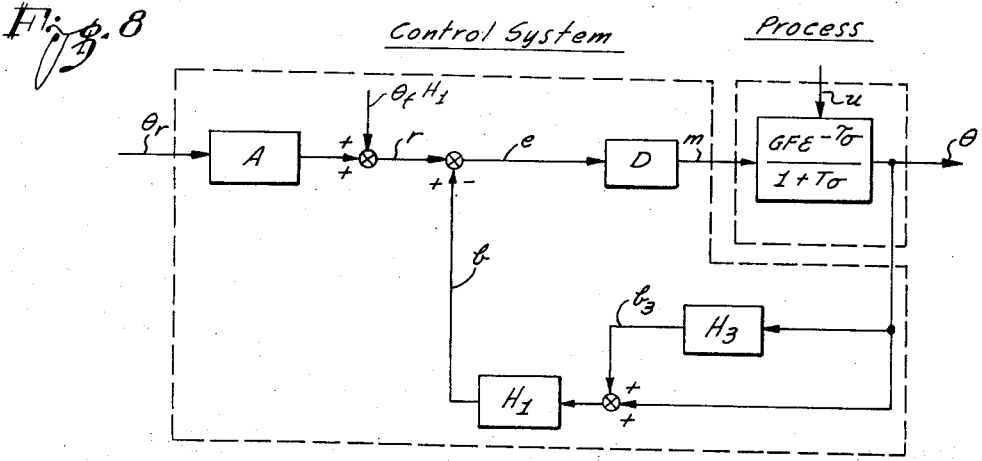
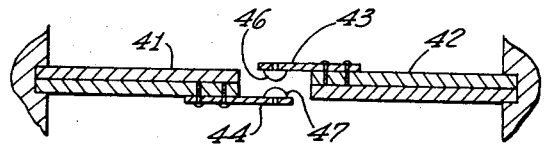
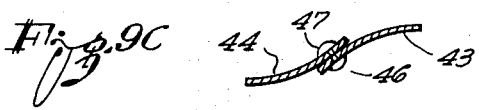
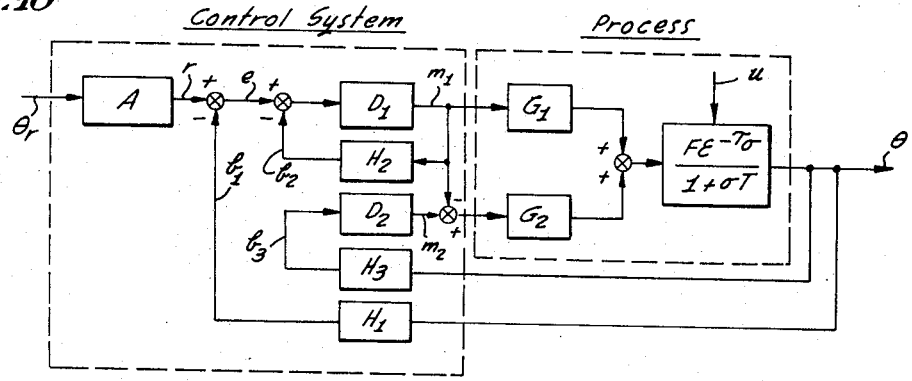
INVENTOR:
William K. Roots
By Ralph M Braunstein
Attorney United States Patent Office 3,361,889
Patented Jan. 2, 1968

3,361,889
CONTROL SYSTEMS AND PROCESSES
William K. Roots, Liverpool, England, assignor to Litton Industries, Inc., Beverly Hills, Calif.
Filed Jan. 6, 1965, Ser. No. 423,716
3 Claims. (Cl. 200—138)

This invention relates to control systems and processes. More particularly it relates to apparatus and methods of correcting for process errors in thermal processes or the like.

As used herein, "thermal process" refers to any process in which temperature, pressure, flow or other condition or variable is to be controlled. Apparatus of the type embodying the invention finds utility in environmental control systems in public buildings, private homes, ground vehicles, ships, aircraft and enclosures of many other types which contain humans, animals or sensitive equipment; in chemical and drug manufacturing and refining plants; in metal smelting and refining processes; in pulp, paper and plastics production; in manufacturing operations of diverse kinds including curing, drying, baking, freezing, space heating and/or cooling; and in atomic and electrical processes. All such processes, including many others in addition to the foregoing examples, wherein one or more variables are subject to control in accordance with a preferred scheme, will be referred to herein as "thermal processes."

It has recently been demonstrated by Roots and Nightingale that many thermal processes are accurately represented by electrical analogs containing a transit delay and an exponential time lag in series. This work is reported in conference papers 63–150 and 63–151 presented at the 1963 Winter General Meeting (New York, Jan. 27–Feb. 1, 1963), of the Institute of Electrical & Electronics Engineers. A survey of the art relating to the use of discontinuous temperature control methods for electrical space heating and cooling processes may be found in conference paper 63–148. Quasi-continuous and multiposition discontinuous control systems are discussed in papers 63–152 and 63–153. Apparatus and methods for correcting process errors represented by transit delays are disclosed in copending U.S. patent application Ser. No. 335,638, filed Jan. 3, 1964, by W. K. Roots and assigned to the assignee hereof.

Control elements may be characterized according to their outputs as continuous, quasi-continuous or discontinuous. Although the following discussion is mainly confined to two-position discontinuous control elements of the type widely used in process control, it is to be understood that the invention relates as well to control elements having continuous or discontinuous and linear or non-linear transfer functions, and to those having more than two positions which are commonly known as multi-position or quasi-continuous control elements.

The objective of a controlled thermal process is that the controlled variable, which may be, for example, temperature, shall equal a command value. If the control variable does not equal the command then a process error exists. It has long been recognized that in thermal processes, such as those involving the heating and/or cooling of large quantities of matter and in which the temperature is regulated by an automatic temperature control system of the closed loop or negative feedback type, the controlled variable is subject to overshoots and undershoots after each correction initiated by the automatic control system. Experience has shown that in all thermal processes the overshoot and undershoot behavior of the controlled variable makes it virtually impossible to achieve the desideratum of maintaining the process error equal to zero. Instead, the error, and hence the controlled variable, fluctuates cyclically as the control system hunts back and forth in a condition of dynamic equilibrium about the command.

An object of this invention is to optimize the performance of control systems by feedback means including means responsive to a time derivative of a controlled variable.

An object of this invention in one embodiment thereof is to reduce the range of fluctuation of the controlled variable about a command value in a controlled thermal process.

An object of the invention in another embodiment is to extend the dynamic equilibrium cycle of a controlled variable in a thermal process, thereby reducing the rate of fluctuation of the variable about the command.

The objects of the invention are achieved in an illustrative system comprising a process to be controlled and closed-loop control means for controlling the controlled variable in response to a command and to feedback information as to the variable and a time derivative thereof. The control means includes means for deriving information as to the controlled variable and as to its time derivative. In one specific embodiment the derivative is the first time derivative of the controlled variable, while in another example information as to the second time derivative is employed.

The above mentioned and other objects as well as the features and advantages of the invention will be thoroughly understood from the following discussion taken in conjunction with the accompanying drawing, in which:

FIG. 8 is a block diagram of the system of FIG. 7;

FIG. 9A is a diagrammatic representation of a transducer forming a part of the invention;

FIGS. 9B and 9C show portions of the transducer of FIG. 9A, in various conditions of operation; and FIG. 10 is a block diagram of an illustrative system embodying the invention.

Process error, represented herein by the symbol Y, is defined as $\theta-r$, where $\theta$ represents the controlled variable and $r$ represents a reference input related, by a transfer function A of a reference input element, to a command $\theta_r$. Process error Y has many components but experience has shown that the most significant is that due to the process transit delay which is represented herein by $\tau$. That portion of Y which is caused by $\tau$ will be identified as $Y_\tau$. It appears in the controlled variable as a series of overshoots and undershoots (of duration $\tau$) about $r'$ where $r'$ is equal to $r/H_1$. $H_1$ represents the transfer function of the primary feedback element.

Figure 1:
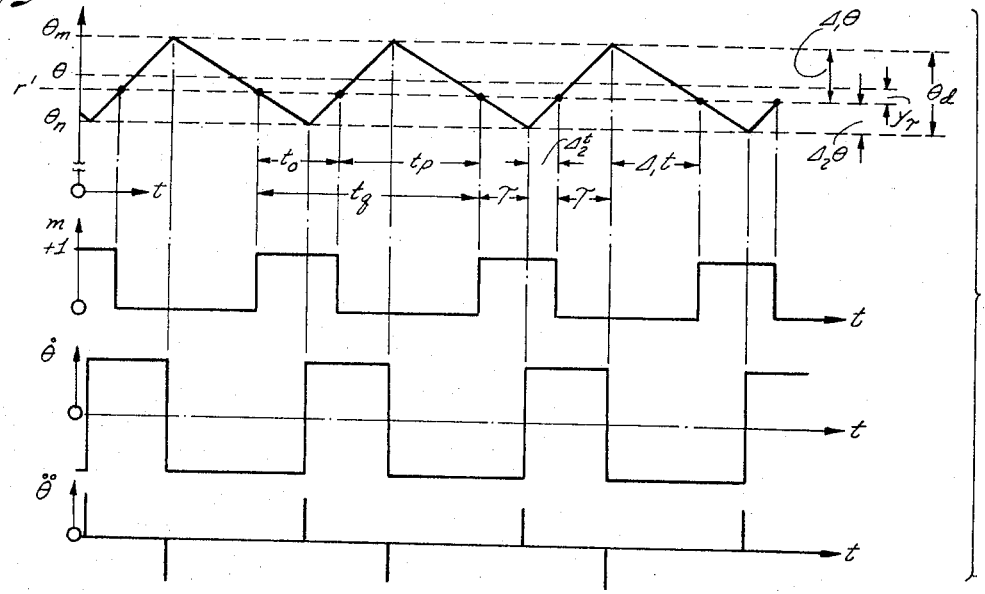
FIG. 1 is a graph showing the relations among several quantities helpful in understanding the invention.

FIG. 1 illustrates the cyclic fluctuation of the controlled variable $\theta$ under steady state conditions in, for example, a space heating process. While FIG. 1 assumes that the control system includes a discontinuous control element, experience has shown that systems with continuous control elements under similar conditions tend to spend most of the time in one or the other of the extreme positions and so are approximated by a two-position system. Associated with the plot of $\theta$ as a function of time is a plot of the manipulated variable $m$. In a typical heating system $m$ may be given a value of $+1$ when power is supplied to the heater and a value of zero when the power is off. In a combined heating-cooling system, $m=-1$ may be used to indicate that the cooling apparatus is energized.

In a system operating as depicted in FIG. 1, $\theta$ overshoots $r'$ by $\Delta_1\theta$ to $\theta_m$, and undershoots $r'$ by $\Delta_2\theta$ to $\theta_n$. That is, during the steady state—when the command $\theta_r$ as well as all external disturbances $u$ are constant—the process is still unstable and fluctuates between $\theta_m$ and $\theta_n$. The best control that can be exercized over the process, therefore, is to hold $\theta$ within $\theta_d$ where $$\theta_d = \theta_m - \theta_n = \Delta_1\theta + \Delta_2\theta$$

In accordance with the principles of the invention, a thermal process, such as a process involving temperature control or the like, comprises a closed-loop control means including means responsive to the time derivative of the controlled variable. $\theta$ has been called the controlled variable rather than the controlled temperature because, although this invention arose from investigations into temperature control, it is equally applicable to the control of many other variables such as pressure, flow, density, concentration, etc.

In a first illustrative embodiment of the invention, in which feedback control means are provided which are responsive to the first time derivative of the controlled variable, the range over which the controlled variable fluctuates during the dynamic equilibrium cycle is materially reduced from the magnitude that would prevail in a simple negative feedback control system of the prior art. The accuracy with which the process is controlled is thereby appreciably increased.

In a second illustrative embodiment of the invention, in which the feedback control means includes means responsive to the second time derivative of the controlled variable, the length of the dynamic equilibrium cycle is materially extended compared to that of simple prior art systems, thereby reducing the rate at which the controlled variable fluctuates between the maximum and minimum values.

Figure 2:
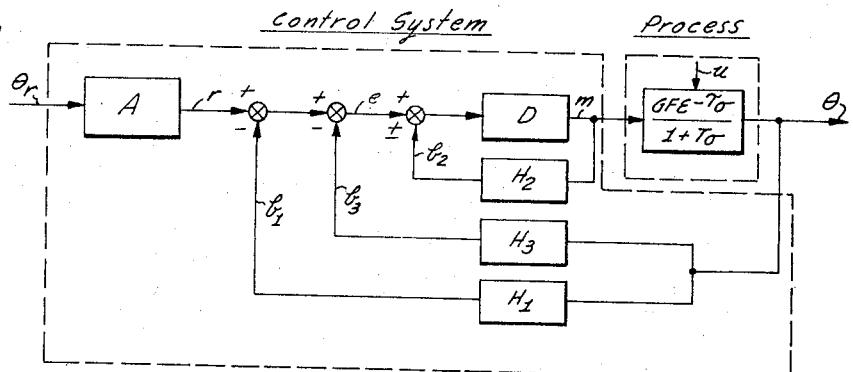
FIGS. 2 and 3 are block schematic diagrams of two illustrative embodiments of the invention.

Referring now to FIG. 2, there is shown a block schematic diagram of a control system and a controlled process embodying the invention. The various blocks indicate the elements in the process and control system according to conventional practice in control engineering. The letters in the blocks represent the transfer functions of each such element, while the symbols between the blocks represent particular parameters involved in the process.

$\theta_r$ represents the command fed into the automatic control system. In a temperature control system, $\theta_r$ is the temperature desired at the location of the temperature sensitive element which is provided to sense the controlled variable. The command $\theta_r$ is fed into a reference input element having a transfer function designated by the symbol A. The reference input element A conveys the command into the actuating signal summation of the control system. The output of the element A, designated by the symbol $r$, is the result of the operation of the transfer function A on the command $\theta_r$. The actuating signal $e$ is produced by combining $r$, representing information as to the command, with the primary feedback. In the case of the illustrative embodiment shown in FIG. 2 the primary feedback has two components $b_1$ and $b_3$ which represent information, derived by the feedback elements $H_1$ and $H_3$, as to the controlled variable and a time derivative thereof. Note that in the embodiment illustrated by FIG. 2, the sensing elements which are responsive to the controlled variable and a time derivative thereof are both located at the same position in the system. That all of the sensing elements of the primary feedback loop may be located at one point is an advantage of the invention in several embodiments.

In the embodiment of FIG. 2 the actuating signal $e$, as modified by the secondary feedback $b_2$, is fed into a discontinuous control element having the transfer function D. The output of the element D is a manipulated variable $m$ which is the quantity directly regulated by the control system and which, in turn, regulates the process to be controlled.

In the controlled process, G represents the gain of the process apparatus. In a heating or cooling process, for example, in which the heating or cooling apparatus is energized for an infinite time, the difference between the final and the initial temperatures at the apparatus is termed the gain of the process apparatus.

The symbol F represents the process attenuation. In a heating or cooling process, for example, the point at which it is desired to control the temperature is usually remote from the location of the process heating or cooling apparatus. Thus, due to the equivalent thermal resistances of the process, an attenuation effect is experienced between the apparatus and the location at which the temperature is to be controlled. This is termed process attenuation.

$\epsilon$ is the base of natural logarithms, while $\tau$ represents the transit delay of the process. If a signal is injected into an element and, after an interval of time, exactly the same signal emerges therefrom, the element is said to cause a transit delay.

T represents the process time constant. If a step input of unit magnitude is applied to an element and the output of the element rises exponentially until in an infinite time it also reaches unit magnitude, then the process time constant is defined as the time taken for the output to reach 63 percent of its final magnitude.

$\theta$ represents the controlled variable. Thus, in a temperature control system, $\theta$ will be the temperature at one or more specific locations within the process.

The control system depicted in FIG. 2 includes a primary feedback loop comprising a first feedback element, with a transfer function designated by $H_1$, which is responsive to the magnitude of the controlled variable $\theta$ and a second feedback element, having a transfer function $H_3$, which is responsive to a time derivative of $\theta$. In a particular embodiment, the element $H_3$ is responsive to the first time derivative of $\theta$, or $\dot{\theta}$. The control system also includes a conventional secondary feedback loop which is responsive to the manipulated variable $m$. The secondary loop comprises a feedback element with a transfer function designated by $H_2$, and produces a feedback signal $b_2$ which compensates for the differential of the discontinuous control element D.

The effect of including feedback means responsive to the first time derivative of the control variable in the primary feedback loop may be understood by referring again to FIG. 1 which shows that in a simple negative feedback control system of the prior art type, the manipulated variable $m$ increases from 0 to $+1$ when $\theta$, decreasing from its maximum of $\theta_m$, attains a value equal to $r'$. The manipulated variable $m$ decreases from $+1$ to 0 when $\theta$, increasing from its maximum at $\theta_n$ attains a value of $r'$. In a simple space heating process, for example, the $+1$ condition of $m$ indicates that the heating apparatus is energized.

It can be seen from FIG. 1 that the range of fluctuation of $\theta$, i.e., $\theta_d$, would be reduced if the changes in $m$ were made to occur at an earlier time in the dynamic equilibrium cycle. Thus, the amount $\Delta_1\theta$ by which $\theta$ overshoots $r'$ after $m$ changes from $+1$ to 0 would be reduced if the change in $m$ were made to occur before $\theta$ reached $r'$. Likewise, the amount $\Delta_2\theta$ by which $\theta$ undershoots $r'$ would be reduced if $m$ were caused to change from 0 to $+1$ before $\theta$ reached $r'$.

In accordance with the principles of the invention the actuating signal $e$, which in a simple negative feedback control system is given by the equation $e = r - H_1\theta$, is modified by the feedback $b_3$ produced by the feedback element $H_3$ in response to the first time derivative of $\theta$. Thus, in the embodiment illustrated in FIG. 2, $e$ is given by the equation $e = r - H_1\theta - H_3\dot{\theta}$. From the plot in FIG. 1 of $\theta$ as a function of $t$ it can be seen that the effect of $H_3$ in the primary feedback loop is to decrease the value of $e$ while $\theta$ is increasing from its minimum at $\theta_n$ to its maximum at $\theta_m$, and to increase the value of $e$ while $\theta$ is decreasing from its maximum at $\theta_m$ to its minimum at $\theta_n$. Thus the advantageous result is achieved of causing the control system to energize the process during the portion of the dynamic equilibrium cycle in which $\theta$ is declining at a time prior to the time at which it becomes equal to $r'$, and to de-energize the process during the portion of the cycle in which $\theta$ is increasing at a time prior to that at which it reaches $r'$.

In a variation of the invention, the primary feedback loop includes a feedback element responsive to the second time derivative of the controlled variable $\theta$, or $\ddot{\theta}$. While this variant in its most general form is described by a block diagram similar to that of FIG. 2, its mode of operation is somewhat different from the embodiment in which $H_3$ is responsive to the first time derivative of $\theta$. More particularly, whereas the embodiment described above acted so as to decrease the range $\theta_d$ over which the control variable $\theta$ fluctuates during the dynamic equilibrium cycle, the second illustrative embodiment acts so as to extend the duration of the cycle itself thereby decreasing the rate at which $\theta$ fluctuates about the command. This is accomplished by energizing the process briefly whenever $\ddot{\theta}$ becomes negative, indicating in a heating process, for example, that the controlled space has begun to cool.

Figure 3:
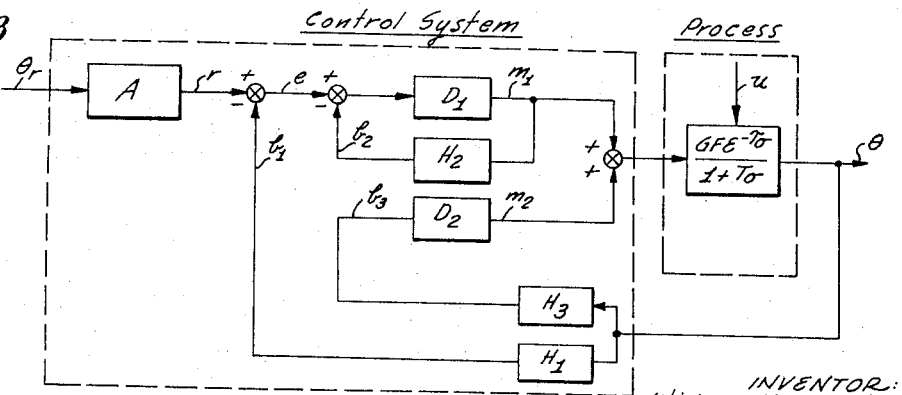
Figure 4:
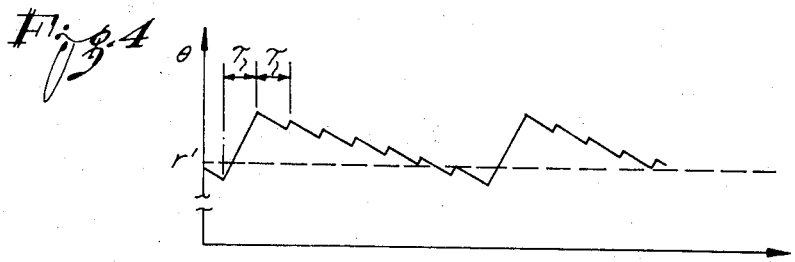
FIG. 4 is a plot of a controlled variable as a function of time in an illustrative system embodying the invention.

A clearer understanding of the second illustrative embodiment of the invention may be gained from a consideration of the block diagram of FIG. 3 in which the output $b_3$ of the feedback element $H_3$ is fed to a second discontinuous control element $D_2$. The output of the control element $D_2$ is a second manipulated variable $m_2$ which has a pulsed positive value when $\ddot{\theta}<0$. For example, in a space heating process employing the control system of FIG. 3, the control element $D_2$ delivers a pulse of energy to the heater whenever $\theta$ begins to decrease. The effect on $\theta$ in a typical controlled process is illustrated by FIG. 4. As can be seen, the cooling time is appreciably extended by periodic injections of energy into the process.

Figure 5:
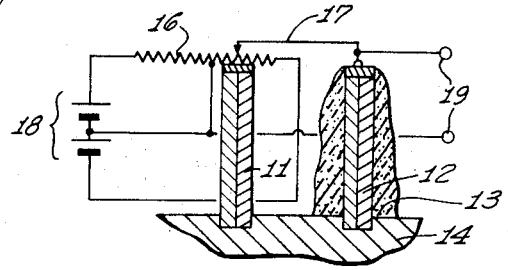
FIGS. 5 and 6 are diagrammatic representations of transducers adapted for use in the invention.

The first and second time derivatives of the controlled variable $\theta$ are plotted as functions of time in FIG. 1. A transducer adapted to provide information as to the sign and magnitude of the first time derivative of the controlled temperature in a system embodying the invention is illustrated in FIG. 5. The transducer comprises a pair of bimetallic cantilevers 11 and 12 having substantially identical motion-temperature characteristics. The bimetallic element 12 is covered with a layer of thermal insulation 13, so that its response lags behind that of the element 11 by a time which may be proportional to the transit delay $\tau$ of the process to be controlled. Both elements 11 and 12 are fastened at one end to a support block 14. The free end of the element 11 carries the resistive portion of 16 of a linear potentiometer, the sliding portion 17 of which is carried by the free end of the element 12. A voltage source 18 is connected across the potentiometer element 16, the mid-point of which is connected to the source 18 so that equal but opposite voltage drops appear across each half of the potentiometer resistance. Thus a positive voltage will be produced across the output terminals 19 when the slider 17 is on one side of the mid-point of element 16 while a negative voltage will be produced when the slider 17 is on the other side of the mid-point.

When the transducer of FIG. 5 is subjected to a temperature change, the bimetallic cantilever 11 responds substantially immediately to the change by bending in one direction or the other while the element 12 responds after a time delay by bending in the same direction as element 11. It can be seen from an examination of FIG. 5 that the position of the slider 17 relative to the mid-point of the fixed element 16 depends on the direction of the temperature change, while the magnitude of the difference between the mid-point and the slider 17 depends on the rate at which the temperature change occurs. The device thus provides information, in the form of an electrical signal, as to the sign and magnitude of the first time derivative of the temperature.

Figure 6:
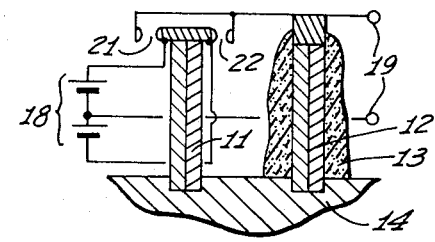

In some control systems information as to the magnitude of the first time derivative of the controlled temperature is unnecessary, the sign or direction of the change being sufficient for the control function. A transducer of this type is illustrated in FIG. 6 and is similar in all respects to that shown in FIG. 5 except that the potentiometer has been replaced by a pair of on-off switches, 21 and 22, formed by contacts carried on the free ends of the bimetallic cantilevers 11 and 12. When $\dot{\theta}$ is positive, one pair of contacts is closed and a voltage of corresponding sign appears at the output terminals 19. When $\dot{\theta}$ is negative, the first pair of contacts opens and the second closes, producing a signal of opposite sign.

Figure 7:
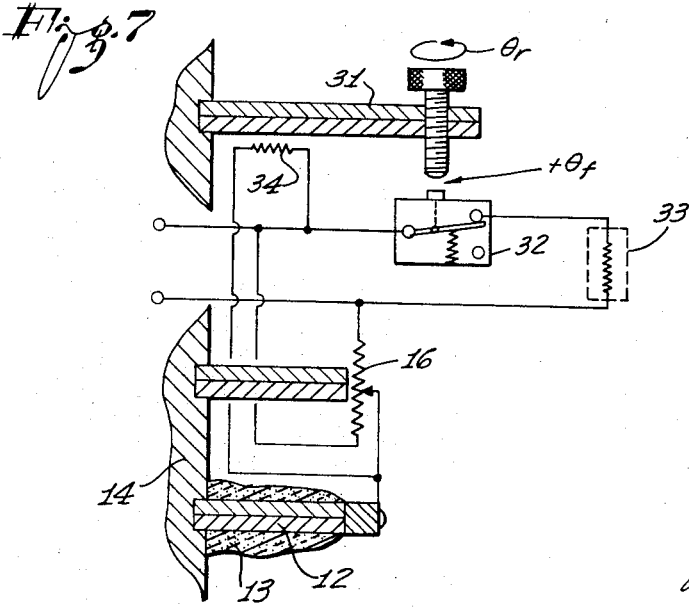
FIG. 7 depicts in schematic form an illustrative space-heating process controlled by a system comprising the transducer of FIG. 5.

The use of a polarity-plus-magnitude type of first derivative transducer, such as that depicted in FIG. 5, in a two-position system controlling an electric heating process is illustrated in FIG. 7. The primary feedback loop of the system includes a bimetallic cantilever 31 and a snap-acting switch control element 32 which, in response to the magnitude of $\theta$, controls the flow of current through the heater symbolized by the resistance 33. The secondary feedback loop that would normally compensate for the differential of this control element has been omitted for clarity.

The reference input to the system of FIG. 7 has been offset so that it will always be high by an arbitrary amount $\theta_f$, and the potentiometer 16, 17 of the transducer is calibrated so that a local heater 34 will heat the element 31 by $\theta_f$ when the slider 17 is at the mid-point of the potentiometer resistance 16. The winding of the potentiometer 16, 17 is advantageously made non-linear to compensate for the square law non-linearity of the local heater 34. A block diagram of this system, shown in FIG. 8, indicates that $b_3$, the feedback signal representing information as to $\dot{\theta}$, is combined with the input to the element $H_1$ to produce a feedback signal $b$ which is then combined with $r$ to yield $e$.

A transducer for sensing positive or negative values of the second time derivative of the controlled temperature in a heating process is depicted in FIGURE 9A. The transducer comprises a pair of bimetallic cantilevers 41 and 42, having substantially identical motion temperature responses. The cantilevers 41 and 42 are mounted to deflect in opposite directions as $\theta$, the controlled temperature, varies. Each of the bimetallic elements carries a thin flexible leaf 43 and 44 of electrically insulating material, on which are mounted electrical contacts 46 and 47. The arrangement of the contacts 46 and 47 may be selected so that the transducer yields signals when $\ddot{\theta}$ is either positive or negative.

Assume that, in response to a decrease in the controlled temperature $\theta$, the bimetals 41 and 42 of the transducer shown in FIG. 9A bend so as to move the contacts 46 and 47 towards each other. Contact is achieved momentarily as the contacts pass through the configuration depicted in FIG. 9B. Thus, the transducer may be employed to produce an electrical pulse in control system which energizes a process heater so as to increase a controlled temperature.

As $\theta$ continues it decline for a short distance beyond the point at which contact is established, the flexible members 43 and 44 bend and finally snap past each other, terminating the pulse. Then, as $\theta$ begins to increase, the bimetals 41 and 42 bend back towards each other so that the flexible members 43 and 44 arrive at the configuration illustrated in FIG. 9C. As $\theta$ continues to increase, the flexible members 43 and 44 snap past each other without contact being established between the contacts 46 and 47. Thus the output of the transducer shown in FIG. 9A comprises a brief electrical pulse whenever the value of $\ddot{\theta}$ is negative, i.e., whenever $\ddot{\theta}$ changes sign from positive to negative. The pulsed output corresponds to the negative values of $\ddot{\theta}$ as plotted as a function of time in FIG. 1.

In a heating process, for example, a transducer of the type depicted in FIG. 9A may be used to control heating apparatus supplementary to the main heater. Alternatively, the output of the transducer may be used to control the injection of relatively large energy pulses into the electrical heating apparatus when it is not energized by commands from the primary feedback element, i.e. when $m=0$. A block diagram of the latter type of system is shown in FIG. 10, wherein $G_1$ and $G_2$ may be considered to represent either a main and a supplementary process heater, or a single heater controlled by either $m_1$ or $m_2$. The manipulated variables $m_1$ and $m_2$ are interlocked to provide the performance desired.

While several illustrative embodiments have been described for the purpose of explaining the underlying principles of the invention, it is to be understood that many variations and modifications are possible and may be made by those skilled in the art without departing from its scope and spirit. For example, while particular transducers have been described herein in terms of bimetallic cantilevers, it may be preferred in some applications to employ bimetallic spirals or other configurations with greater sensitivity. Similarly, motion-temperature transducers employing bimetallic elements may be replaced by those utilizing thermal properties of liquids or gases. Other types of transducers may also be used. In addition, feedback means responsive to the time derivatives of the controlled variable may be combined in the primary feedback loop of a control system in numerous ways of which the particular embodiments described in this specification are only illustrative.

What is claimed is:

1. Transducer for providing information as to the second time derivative of a controlled variable, comprising
    a switch having a pair of normally open contacts, and
    means responsive to the controlled variable for moving said contacts to a closed condition and then to an open condition in response to a change of the controlled variable in one sense and for returning said contracts without passing through the closed condition to their initial open condition in response to a change of the controlled variable in the opposite sense.

2. Transducer as claimed in claim 1 wherein said contacts are affixed to the overlapping free ends of a pair of flexible cantilevered electrically insulating members.

3. Transducer as claimed in claim 1 wherein said means responsive to the controlled variable comprises at least one temperature responsive bimetallic element.

References Cited

UNITED STATES PATENTS

| | | | |
|---|---|---|---|
| 1,497,164 | 6/1924 | Behr | 236—1 |
| 1,782,045 | 11/1930 | Mason | 236—1 |
| 1,920,827 | 8/1933 | Wunsch | 236—82 |
| 2,020,847 | 11/1935 | Mitreff | 236—79 X |
| 2,282,726 | 5/1942 | Jones | 236—78 |
| 2,331,476 | 10/1943 | Jones | 236—9 |
| 2,574,925 | 11/1951 | Lehane et al. | 236—9 |
| 2,640,649 | 6/1953 | Rusler | 236—9 |
| 2,751,462 | 6/1956 | Markowitz | 200—113.10 |

EDWARD J. MICHAEL, *Primary Examiner.*